United States Patent [19]

Lamoureux et al.

[11] Patent Number: 4,995,773
[45] Date of Patent: Feb. 26, 1991

[54] SPREADER AND DUMP TRUCK CONSTRUCTION

[75] Inventors: Guy Lamoureux, Drummondville; Jean-Marie Bibeau, St. Gabriel de Brandon, both of Canada

[73] Assignee: Tenco Machinery Ltd., Quebec, Canada

[21] Appl. No.: 460,507

[22] Filed: Jan. 3, 1990

[51] Int. Cl.⁵ .............................................. B60P 1/04
[52] U.S. Cl. ................................ 414/489; 414/488; 414/491; 414/501; 414/528; 298/1 A; 298/1 B
[58] Field of Search ............... 414/486, 488, 489, 491, 414/501, 523, 528; 298/1 A, 1 B

[56] References Cited

U.S. PATENT DOCUMENTS

| | | | |
|---|---|---|---|
| 2,791,339 | 5/1957 | Sprague | 414/528 X |
| 2,988,368 | 6/1961 | Kerr | 414/528 X |
| 3,010,727 | 11/1961 | Swenson et al. | 414/528 X |
| 3,049,251 | 8/1962 | Glew | 414/528 |
| 3,317,006 | 5/1967 | Hamm | 414/528 |
| 3,648,859 | 3/1972 | Johnson | 414/528 X |
| 3,929,292 | 12/1975 | Phillips | 414/528 X |
| 4,106,643 | 8/1978 | McGehee | 414/528 |
| 4,923,539 | 5/1990 | Petri et al. | 414/528 X |

FOREIGN PATENT DOCUMENTS

| | | | |
|---|---|---|---|
| 2546115 | 11/1984 | France | 414/528 |
| 53237 | 3/1984 | Japan | 414/489 |
| 8200118 | 1/1982 | World Int. Prop. O. | 414/528 |

*Primary Examiner*—Robert J. Spar
*Assistant Examiner*—John Van den Bosche
*Attorney, Agent, or Firm*—Wolf, Greenfield & Sacks

[57] ABSTRACT

A lightweight salt and sand spreader dump truck box having a first sub-frame with elongated longitudinal channel members formed from sheet metal and a conveyor frame on which a conveyor is mounted longitudinally of the dump box at the floor thereof near a side wall of the dump box, wherein the conveyor frame is integral with the sub-frame. A second sub-frame is pivoted about a longitudinal axis adjacent the conveyor frame on the opposite side from the first side frame member and includes a wall member which, when in a down position, is flush with a side frame member of the first sub-frame.

5 Claims, 5 Drawing Sheets

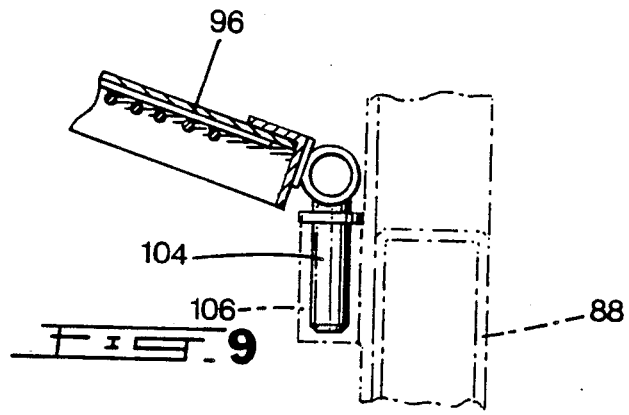
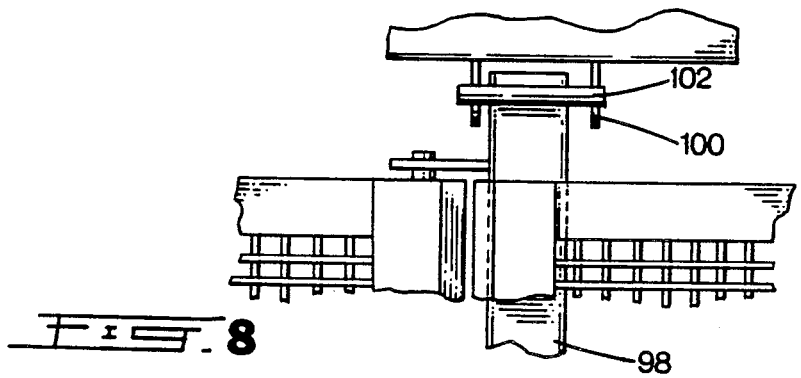
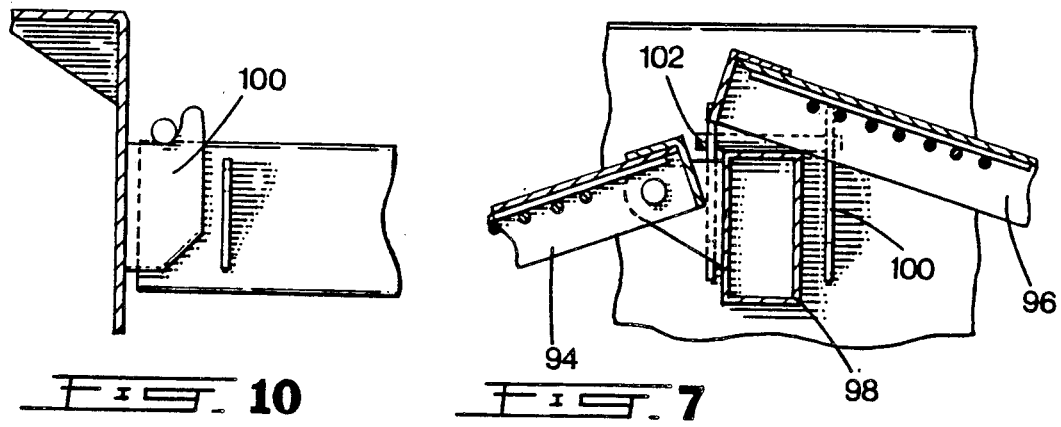

SPREADER AND DUMP TRUCK CONSTRUCTION

BACKGROUND OF THE INVENTION

1. Field of the Invention

The present invention relates to dump truck vehicles, and more particularly, to a dump truck which is adapted as a spreader.

2. Description of the Prior Art

Spreader/dump truck vehicles are well known in the art. Such vehicles are adapted especially for the purpose of spreading road salt on winter roads as well as conventional dump truck purposes, such as transporting sand and other granular materials.

Most such spreader/dump trucks are of the type whereby the dump body is tiltable fore and aft of the truck chassis, in combination with a conveyor which extends laterally thereof for feeding road salt to a rotary disc type spreader situated below the chassis. It has been found that a dump body which tilts fore and aft can seriously shift the center of gravity of the load and thus of the vehicle rendering the driving of the vehicle hazardous during a spreading mode.

It has been suggested to have a side dump truck with a conveyor extending longitudinally of the body. Such a construction is illustrated in U.S. Pat. No. 3,010,727, Swenson et al, 1961, wherein a longitudinal conveyor is provided on the side of the truck frame and the whole dump box tilts about a longitudinal axis adjacent the conveyor However, such an arrangement presents a problem of shifting the center of gravity laterally relative to the direction of travel of the truck which can also present a driving hazard.

Another factor affecting spreader/dump trucks is the increase in weight caused by the additional frame structure to provide for side tilting and rear dumping of the dump box and the additional reinforcing of the frame to accommodate such a versatile dump truck.

SUMMARY OF THE INVENTION

It is an aim of the present invention to provide a salt/sand spreader and dump truck utilizing a side dump principle while minimizing the shifting of the center of gravity.

It is a further aim of the present invention to reduce the weight of a spreader/dump truck and, in particular, the overall weight of the dump box and frame supporting the dump box.

It is a further aim of the present invention to provide an improved screen device on the dump box for the purposes of screening the salt when it is being loaded into the dumptruck.

A construction in accordance with the present invention comprises a spreader and dump truck comprising a vehicle, a longitudinal axis in the direction of travel and having a chassis with a rear portion, and a dump box frame pivotally mounted about a lateral axis on the rear portion of the chassis. The dump box frame includes a first sub-frame having longitudinal first and second side frame members, and a front bulkhead having a side pillar on either side thereof mounted on the first and second side frame members. A pair of side pillars is provided on the first and second side frame members at the rear of the first sub-frame. The first sub-frame includes at least a pair of longitudinal beam members extending parallel to the first and second side frame members, and spaced an equal distance on either side of a central longitudinal axis of the dump box frame. The pair of beam members includes a first channel-shaped beam member and a second channel-shaped beam cam member, the second channel-shaped beam member having an upper flange which is angled. A conveyor is provided including a conveyor frame which has a pair of parallel edge members and a conveyor belt passing over the conveyor frame between the edge members. The conveyor frame is integrated in the first sub-frame between the first side frame member and the second channel-shaped beam member. An edge member of the conveyor frame is connected to the upper, angled flange of the second channel-shaped beam member. The other edge member of the conveyor frame is connected to the first side frame member A second sub-frame is provided on the first sub-frame member on one side of the conveyor between an edge member of the conveyor frame and the second side frame member and has a hinge axis parallel and adjacent the conveyor frame edge member. The second sub-frame includes a third side frame member co-extensive with the second side frame member of the first sub-frame when the second sub-frame is in a lowered position. A side wall is provided on the third side frame member of the second sub-frame adapted to fit between the side pillar of the bulkhead and the rear pillar on the second side frame member of the first sub-frame and within a plane including the pillars. Means are provided for pivoting the second sub-frame away from the first sub-frame about the hinge axis.

In a more specific embodiment the second sub-frame is hingedly connected to the angled flange of the second channel-shaped beam member.

By having a pivoting second sub-frame hinged longitudinally within the confines of the first sub-frame and adjacent a conveyor provided on the first sub-frame, only a portion of the dump box pivots upwardly, thereby maintaining the center of gravity in the vicinity of the central longitudinal axis of the vehicle as compared to a side dump truck wherein the longitudinal conveyor is outboard of the dump box, and the whole of the dump box is made to pivot along an axis at a side edge thereof.

Further, by having the second sub-frame and the first sub-frame complementing the structure of the side wall, i.e., with the side wall portion mounted to the second sub-frame and the front and rear pillars mounted to the first sub-frame, and by having the conveyor frame and longitudinal beam members integrated, considerable weight saving is obtained as compared with previous attempts.

In the event that the dump box is to be used as a conventional rear dump truck, a cover is provided over the conveyor to provide a smooth bottom wall surface. An optional screen device may be provided hinged to the side walls. The screen is utilized for the purpose of screening the salt when it is being loaded. A pair of screen panels overlap each other and are each pivoted to a respective side wall.

BRIEF DESCRIPTION OF THE DRAWINGS

Having thus generally described the nature of the invention, reference will now be made to the accompanying drawings, showing by way of illustration, a preferred embodiment thereof, and in which:

FIG. 4 is a fragmentary enlarged perspective view in cross-section taken along line 4—4 of FIG. 1a;

FIG. 7 is an enlarged vertical cross-section along line 7—7 of FIG. 5;

FIG. 8 is a fragmentary enlarged top plan view of the detail shown in FIG. 7;

FIG. 9 is an enlarged fragmentary cross-section, partly in dotted lines, taken along line 9—9 in FIG. 5; and FIG. 10 is an enlarged fragmentary cross-section taken along line 10—10 in FIG. 5.

DESCRIPTION OF THE PREFERRED EMBODIMENTS

Figure 2:
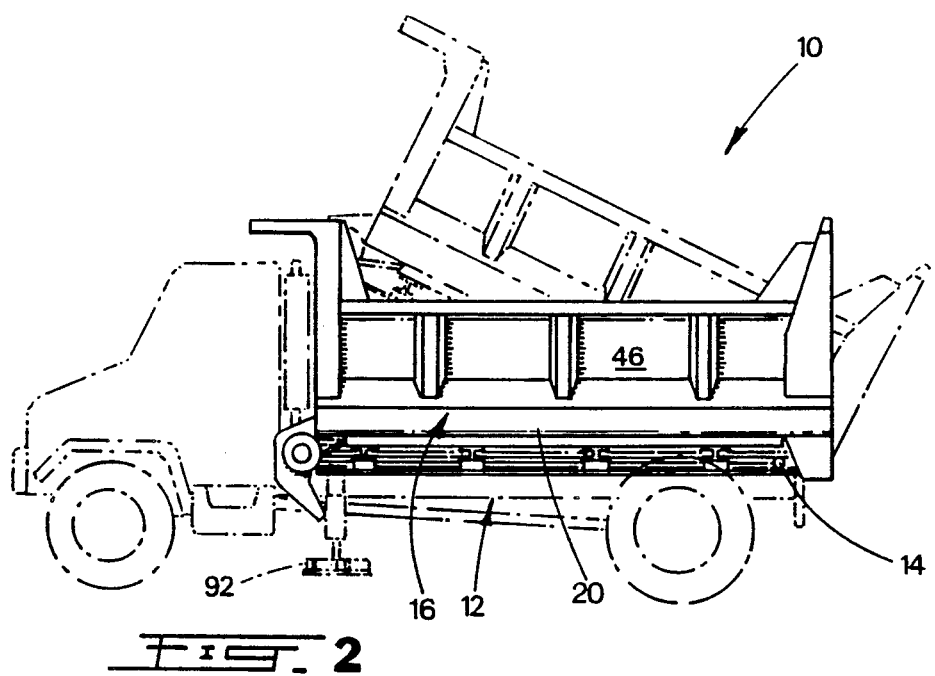
FIG. 2 is a side elevation thereof.

Referring now to the drawings and particularly to FIGS. 1a, 1b, 2, and 3, there is shown a dump box 10 adapted to be mounted on a vehicle chassis 12 of a typical truck type vehicle shown in dotted lines in FIG. 2. Although the dump box 10 looks like and can operate as a conventional rear dump box, it, in fact, serves two purposes—one as a conventional dump box and the second as a salt/sand spreader dump box.

Figure 1A:
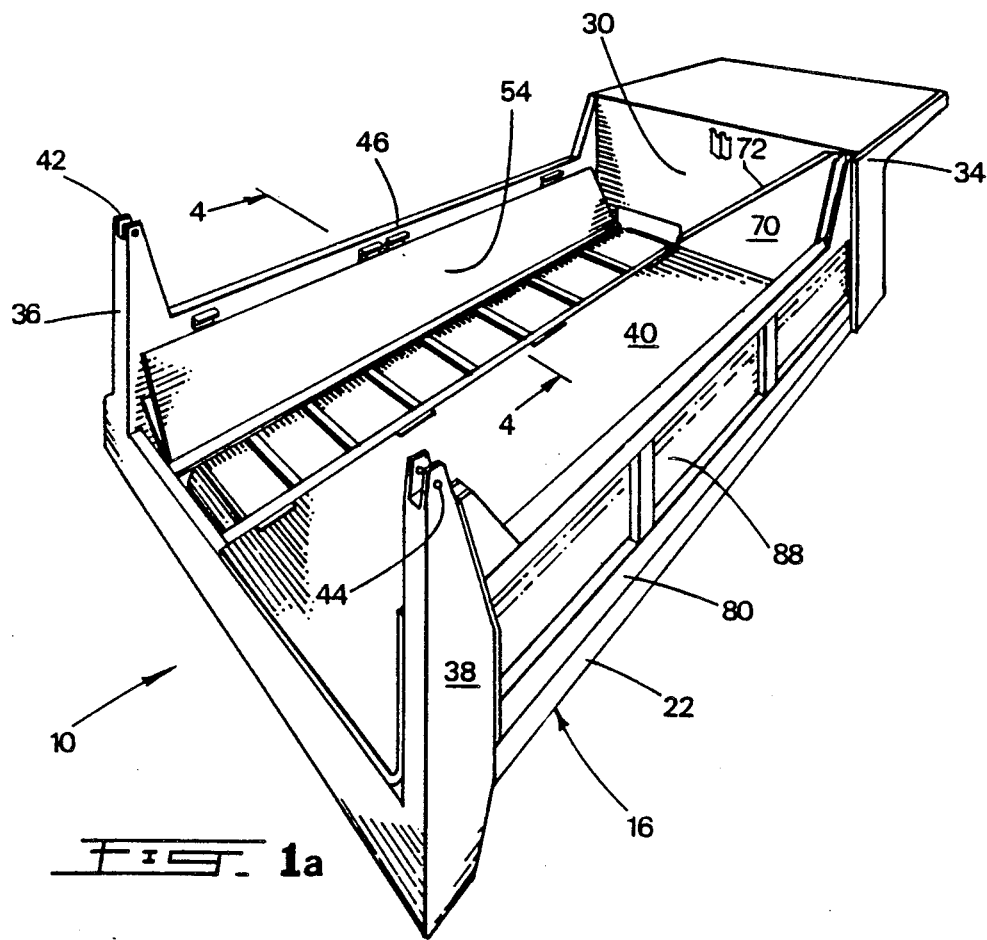
FIGS. 1a and 1b are perspective views of a dump box of the present invention, in different operative positions.
Figure 1B:
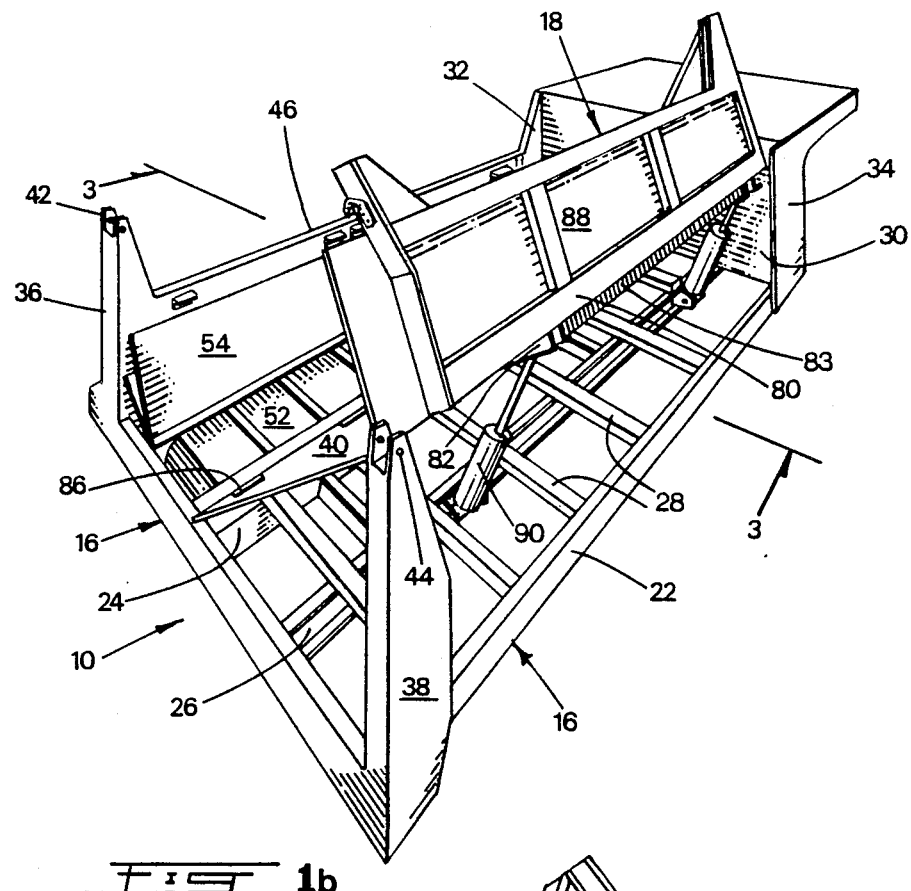
Figure 3:
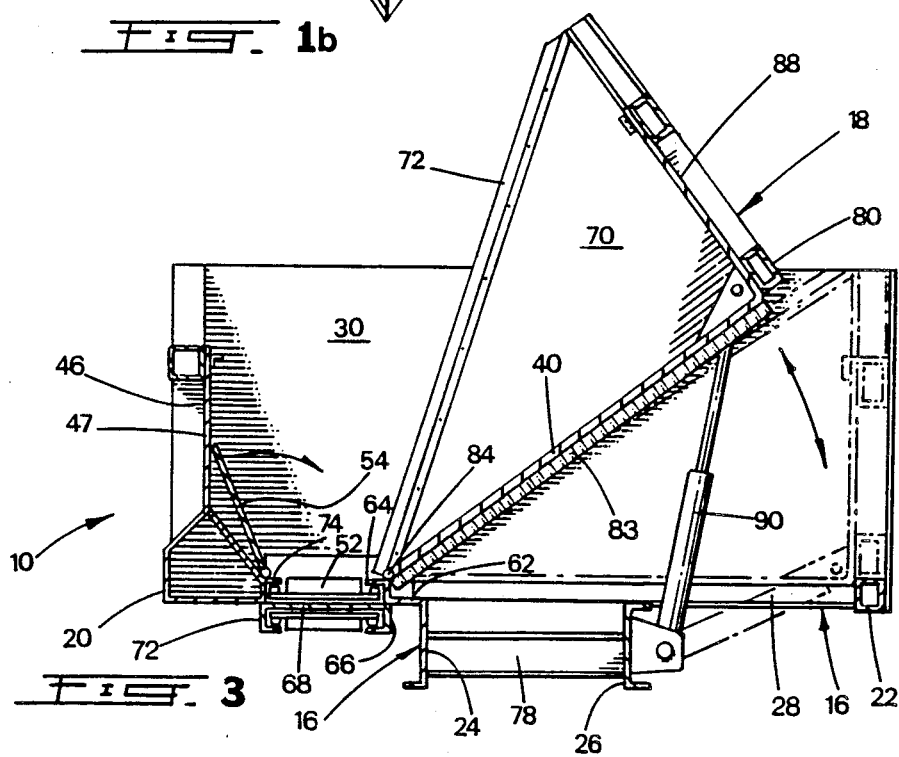
FIG. 3 is a vertical cross-section taken along line 3—3 of FIG. 1.
Figure 4:
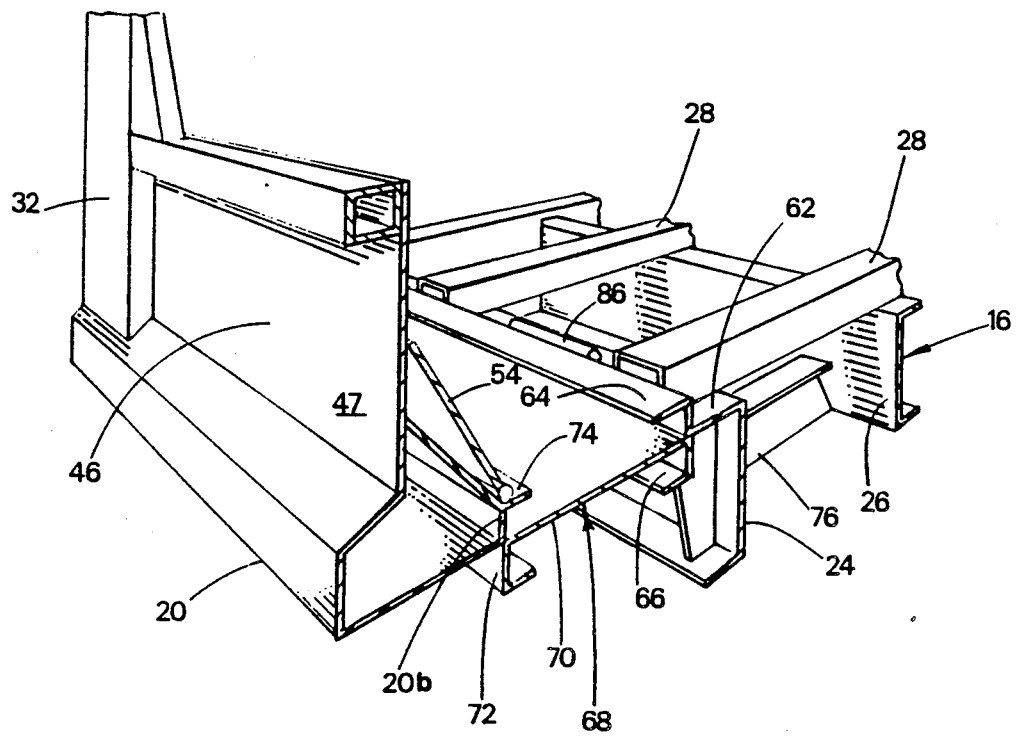

The construction of the dump box 10 includes a first sub-frame 16 mounted to a rear hinge 14 on the truck chassis 12. The sub-frame 16, as best shown in FIGS. 1b, 3, and 4, includes side frame members 20 and 22. Side frame member 20 is made integral with the panel 47 of side wall 46. This may be formed from a metal plate which is bent to form the wall 46 and the side frame member 20 Longitudinal beams 24 and 26 extend the length of the first sub-frame 16, and a Plurality of laterally extending box beam members 28 are part of the structure of the first sub-frame 16. The lateral beams 28 are welded to the side frame 22 and to the beams 24 and 26.

A front bulkhead 30 is mounted to the first sub-frame 16 and includes side pillars 32 and 34 mounted respectively to side frame members 20 and 22. Rear pillars 36 and 38 are also mounted to side frame members 20 and 22 and are adapted to hang a dump gate (not shown) at dump gate hinge brackets 42 and 44. A side wall 46 extends between the pillars 32 and 36 and is welded therewith A conveyor 52, as shown in FIGS. 3 and 4, is mounted within the frame structure of the sub-frame 16 so that the upper run of the conveyor belt is slightly below the bottom floor 40 of the dump box. A cover plate 54, which is pivotally mounted on side frame member 20 and pivots along an axis adjacent the conveyor 52, between the side wall 46 and the other edge of the conveyor, is provided for covering the conveyor 52 when the dump box is utilized in its rear dump mode for carrying gravel, etc.

As shown in FIGS. 3 and 4, the beams 24 and 26 are channel members which have been fabricated from sheet metal and bent to form the beams. In particular, beam 24 has an upper flange 62 which is bent to form an angle member 64. The conveyor frame 68 includes a flat web member 68 which is bent at both ends to form the channels 66 and 72. The conveyor belt would have its upper run above the channel frame 68 and the return run between the channels 72 and 66. The upper run would pass between the channels 64 and 74 so formed.

The channel 74 is formed by a strip of metal being welded against the side web 20b of the side frame member. All of the elements of the first sub-frame 16 are either bent sheet metal or other light structural elements. Other lateral beam members 78 extend between the channel members 24 and 26, while the remainder of the sub-frame includes the aforementioned lightweight lateral box beam members 28.

The second sub-frame 18 includes a side frame member 80 and a plurality of laterally extending channel beam members 82 which are welded to the side frame member 80 but offset therefrom so that the channel members, when the second sub-frame 18 is in its lowered position, lie in the same plane as the beam members 28. A light weight honeycomb structure 83 extends between the beams 82. A cover plate 40 is welded to the channel beam members 82 and to the side frame members 62. The second sub-frame 18 is hinged to a hinge shaft 84 which extends in sleeves 86 welded to angle 64 of the beam member 24 as shown in FIG. 3.

A side wall 88 is mounted on the second sub-frame 18 in a plane containing the side frame member 80. The side wall 88 is such as to mate with the rear pillar 38 and the front pillar 36.

A front plate 70 is welded to the floor panel 40 and includes a rubber seal 72. The plate 70 slides against the bulkhead 30, and with the rubber seal 72, prevents granular material from being lodged between the front plate 70 and the bulkhead 30 and acts as a wiper therefor.

As shown in FIGS. 1b and 3, a piston and cylinder arrangement 90 is provided on a bracket mounted on the channel beam 26 at one end and is pivotally connected to the side frame member 80 at the other end. One or two such piston and cylinder arrangements can be provided between the first sub-frame 16 as represented by the beam 26 and the second sub-frame 18 as represented by the side frame member 80.

When it is required to use the dump box 10 in a salt spreading mode, the cover 54 is opened, exposing the conveyor 52, thus exposing the top run of the conveyor belt 52, and salt is fed into the dump box 10 with the second sub-frame 18 in its lower position.

As it is required to move the salt onto the conveyor as the load is reduced, the second sub-frame 18 is gradually pivoted upwardly by operating the piston and cylinder arrangement 90. Thus, as seen in FIG. 3, the salt/sand will be shifted onto the conveyor 52 for feeding onto a circular salt/sand feeder 92 shown in dotted lines in FIG. 2.

Figure 5:
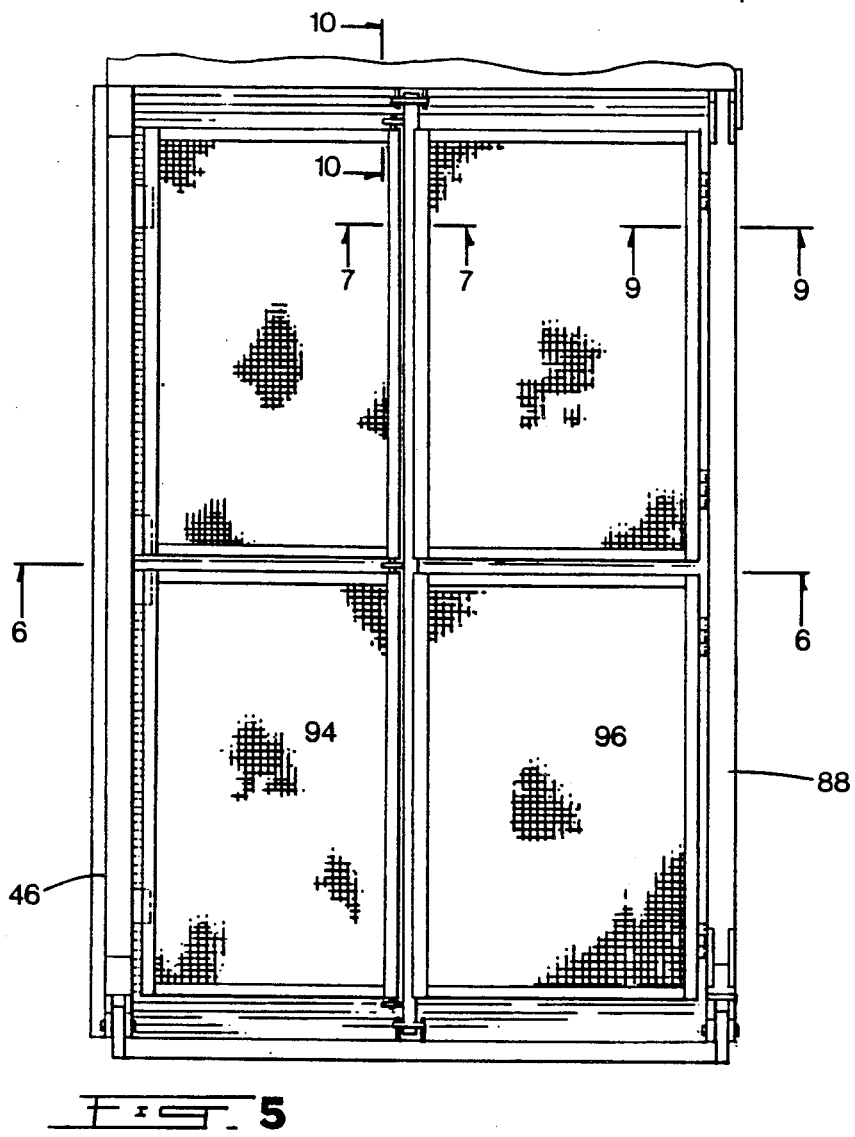
FIG. 5 is a fragmentary top plan view of the dump box provided with the optional screen.
Figure 6:
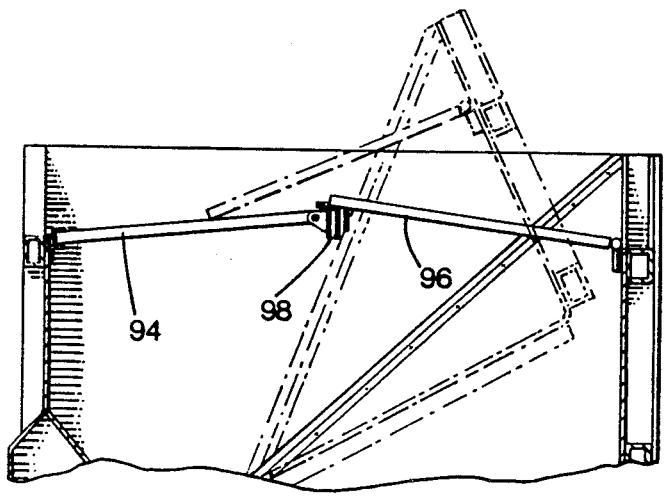
FIG. 6 is a vertical cross-section taken along line 6—6 of FIG. 5.

An optional screen device can be provided on the dump box as shown in FIGS. 5 and 6. The screen device must be articulated so that it will fold properly when the second sub-frame 18 is tilted upwardly from the first sub-frame 16. As shown in FIG. 5 and 6, the screens 94 are hinged to a central beam 98 and are hinged at each side to the fixed side wall 46 and the side wall 88.

The screen 96 merely overlaps beam 98 such that when the second sub-frame 18 is pivoted upwardly the screen 96 will glide on the top surface of screen 94 shown in dotted lines in FIG. 6.

FIG. 7 and 8 show the details of how the screens 94 and 96 are mounted. For instance the beam 98 is hooked at each end to brackets 100 by means of a lateral pin 102 which settles the brackets 100. The screens 94 and 96 are mounted to the side walls 46 and 88 respectively by means of a hinged drop pin 104 which is seated in a socket 106 shown in dotted lines in FIG. 9.

The purpose of the screens 94 and 96 is for screening the salt when it is being loaded into the dump truck box 10. In a sand mode, the screens 94 and 96 can be removed by lifting the screens out of their respective sockets 106 and by removing the beam 98 from brackets 100 which are provided on the bulkhead and on the rear tail-gate.

We claim:

1. A spreader and dump box for a truck vehicle having a chassis with a rear portion, the dump box comprising a dump box frame pivotally mounted about a lateral axis on the rear portion of the vehicle chassis, the dump box frame further comprising a first sub-frame having longitudinal first and second side frame members and a front bulkhead having a side pillar on either side thereof mounted on the first and second side frame members, a pair of side pillars provided on the first and second side frame members at the rear of the first sub frame, the first sub-frame including at least a pair of longitudinal beam members extending parallel to the first and second side frame members and spaced an equal distance on either side of a central longitudinal axis of the dump box frame, the pair of beam members including a first channel-shaped beam member and a second channel-shaped beam member, the second channel-shaped beam member having an upper flange which is angled, a conveyor including a conveyor frame which has a pair of parallel edge members and a conveyor belt passing over the conveyor frame between the edge members, the conveyor frame being integrated in the first sub-frame between the first side frame member and the second channel-shaped beam member, an edge member of the conveyor frame being connected to the upper, angled flange of the second channel-shaped beam member, the other edge of the conveyor frame being connected to the first side frame member, a second sub-frame hingedly mounted on the first sub-frame member on one side of the conveyor between an edge member of the conveyor frame and the second side frame member, and having a hinge axis parallel and adjacent the conveyor frame edge member, the second sub-frame including a third side frame member co-extensive with the second side frame member of the first sub-frame when the second sub-frame is in a lowered position, and a side wall being provided on the third side frame member of the second sub-frame adapted to fit between the side pillar of the bulkhead and the rear pillar on the second frame member of the first sub-frame and within a plane including the pillars, and means for pivoting the second sub-frame away from the first sub-frame about the hinge axis.

2. A dump truck box as defined in claim 1, wherein the conveyor frame includes sheet metal bent to form channel members at the edges thereof located in the sub-frame so that the channels are below a web of the frame, the angle formed on the upper flange of the second channel beam complementing the conveyor frame to form a channel along one edge member of the conveyor frame, and a channel formed at the other edge of the frame member with the side frame member such that the conveyor frame is formed with inwardly extending channels at the edge members of the conveyor frame for the upper run and for the lower run of the conveyor belt.

3. A dump truck box as defined in claim 1, wherein the longitudinal beam members are formed from sheet metal which is bent to form outwardly facing channels, and lateral lightweight metal beams are connected to the longitudinal beam members to make up the first frame member.

4. A dump truck box as defined in claim 3, wherein the first side frame member mounts the dump box side wall member, and the side wall member and the first side frame member are formed of one piece from sheet metal bent to form a box-like side frame member.

5. A spreader and dump truck as defined in claim 1, wherein screens are provided on the dump truck for purposes of screening the salt when being loaded, the screens having at least a first and second screen panels with the first panel being hingedly mounted to the top of the fixed side wall and to a longitudinal beam extending between the screen panels and longitudinally of the dump box, the second screen panel being hingedly mounted to the side wall of the second frame member and slidingly supported at its other edge on the longitudinal beam such that when the second frame member is pivoted upwardly the second screen panel will slide over the longitudinal beam and overlap the first screen member.

* * * * *